May 30, 1939.　　　　S. S. GREEN　　　　2,160,416
BALANCING PLATE FOR WATT-HOUR METERS
Filed Feb. 16, 1938
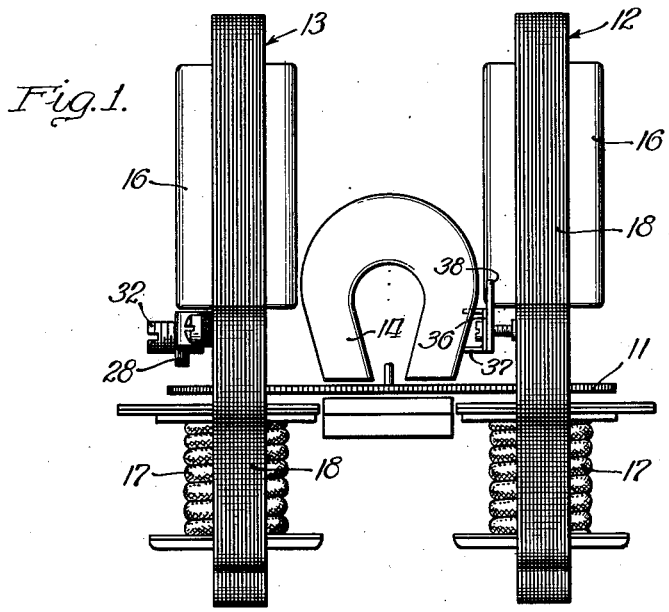
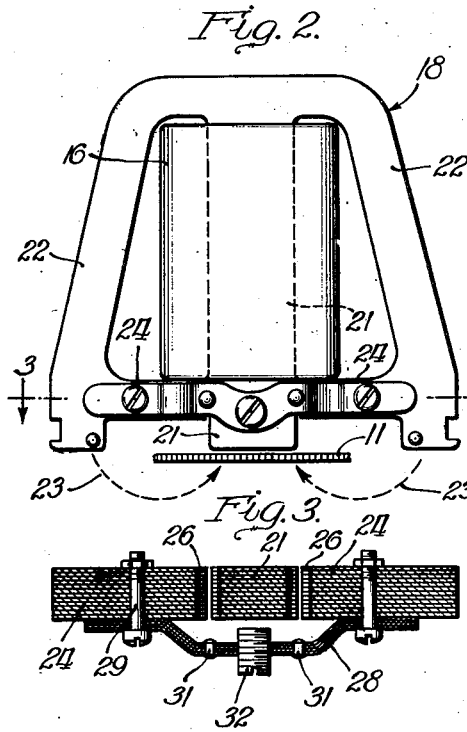
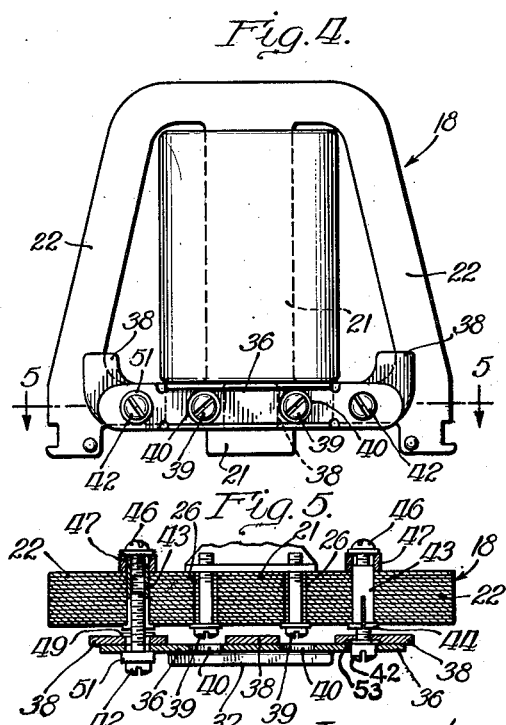
Inventor:
Stanley S. Green
By:
Louis Robertson Atty.

Patented May 30, 1939

2,160,416

UNITED STATES PATENT OFFICE 2,160,416

BALANCING PLATE FOR WATT-HOUR METERS

Stanley S. Green, La Fayette, Ind., assignor to Duncan Electric Manufacturing Company, La Fayette, Ind., a corporation of Illinois Application February 16, 1938, Serial No. 190,723

4 Claims. (Cl. 171—264)

This invention relates to multi-element watt-hour meters and particularly to the balancing of the two driving elements of such meters so that they will exert equal driving torques on the meter disc under identical load conditions.

In measuring the consumption of electrical energy in polyphase circuits it is necessary to use a meter having a plurality of driving units. Two units are necessary for the common three-wire, three-phase circuits; and four-wire circuits require three driving units. Two driving elements may both act on one disc as in the illustrated form of meter or may each act on separate discs as has been common in former years. In either case the disc or discs ordinarily are mounted on a single shaft, drive a single register, and may be called a single rotor. The disc or discs are retarded by permanent damping magnets which are adjustable to adjust the meter as a whole but have the same effect as to both driving units and hence cannot correct the errors which will result if one driving unit is slightly stronger than the other.

In manufacturing practice such variations between driving units are of course minimized, but nevertheless it is impossible to make the units exactly alike and to position them exactly the same with respect to the disc. The result is that whenever two driving units are assembled into a meter, the chances are that one of them will be slightly stronger than the other. If the damping magnet were adjusted to give accurate meter readings with only one of the driving units functioning, the meter would necessarily be inaccurate whenever the other driving unit was functioning. Since no possible adjustment of the damping magnet acting on a single rotor can compensate for such inequality between driving units, it is necessary to provide some means for bringing the driving units to exact equality as to the rotative torque which they produce on the disc.

Various means have heretofore been provided for equalizing the driving torques of the two or more driving units within a meter. Such means are generally called balancing devices. One principle commonly utilized in balancing units heretofore has been the shunting of flux between two portions of the laminated core structure of the driving unit in such a manner as to divert this flux from the disc. The present invention provides improved balancing devices working on this same principle. These balancing devices combine the various desirable features of simplicity of construction, ease of operation, and permanency of adjustment. Furthermore, they have a very important advantage of being adapted for use in conjunction with a standard form of driving unit. This is important because of the fact that the vast majority of driving units are used in single phase meters having only one driving unit and are not provided with any balancing device. From a commercial standpoint it is highly desirable to be able to use these standard driving units which are produced in great quantities and merely add balancing devices to them to make them suitable for use in multi-element meters.

The advantages and objects of the invention will be made more apparent by the following description and by the drawing, in which:

Fig. 1 is a largely diagrammatic side elevation of a two-element meter mechanism showing the most easily adjustable form of balancing device on the left-hand element and a different form of balancing device on the right-hand element which ordinarily does not need to be adjusted.

Fig. 2 is a front elevation of the upper portion of the driving unit seen at the left in Fig. 1.

Fig. 3 is a sectional view taken on the line 3—3 of Fig. 2.

Fig. 4 is a view similar to Fig. 2 but showing a modified form of balancing device.

Fig. 5 is a sectional view taken on the line 5—5 of Fig. 4.

Although this invention may take numerous forms, it is not necessary to illustrate or describe more than enough to give a thorough understanding of the invention. The preferred form of the invention is seen in Figs. 1 to 3, especially Figs. 2 and 3. The invention is used in connection with a watt-hour meter having a disc 11 driven by a rear driving unit 12 and a front driving unit 13 and retarded by a damping magnet system including a permanent magnet 14. The driving unit 12 may be carried by the meter base, and the front unit 13 and the magnet 14 by a frame carried by the driving unit 12.

In order to completely understand the present invention it is desirable to understand certain simple facts of meter construction and operation. Each driving unit includes a voltage coil 16 and a current coil 17, both coils being carried by laminations 18. Each of the coils 16 and 17 causes magnetic flux (magnetism) to pass through the disc 11, and it is only that flux which passes through the disc 11 that is useful in driving the disc. The path of the flux of the current coil 17 may be ignored. The voltage flux generated by the voltage coil 16 passes through the disc by virtue of traversing the main voltage flux path which comprises the core 21, the yokes 22, and the lower portion of the laminations 18, this lower portion being indicated in Fig. 2 diagrammatically by the dotted arrows 23.

In addition to this useful path for the voltage flux there is a shorter path formed by the core 21, the yokes 22, and the shunt arms 24, which are really part of yokes 22 and have long been commonly provided to serve certain useful functions in obtaining meter accuracy. These functions need not be considered in this application, but it should be pointed out that the shunt arms 24 are separated from the core 21 by air gaps 26 so that the amount of flux which traverses this short path is rather low. In the past, balancing of the two driving units has sometimes been accomplished by inserting magnetic pegs in the gaps 26 so that the adjustment of these pegs in and out of the gaps 26 would cause more or less flux to pass through the shunting arms 24, and hence divert more or less of the flux from its useful path indicated by the arrows 23.

There have been objections to this particular form of flux diversion and in many meters the air gaps 26 are used for other purposes with the result that they are not available for use in this manner. One of the most important objections to this manner of flux diversion is that it is likely to interfere with the normal functions of the shunt arms 24 mentioned above.

According to the present invention a balancing device is provided which functions without interfering with the gaps 26 either as to the normal function of these gaps or as to their availability for other parts. In brief, this invention includes a shunting plate which in Figs. 1 to 3 is made up of laminations 28 but which in all figures extends from the face of one shunt arm 24 to the other, passing in proximity to the core 21 so as to shunt flux from the shunt arms 24 to the core 21 and divert this flux from the disc 11. The laminations 28, which may also be called the laminated plate 28, may be secured to the shunt arms 24 in a very simple manner as by bolts 29, which are preferably non-magnetic. For convenience the laminations may be secured together by rivets 31. They are shaped to extend away from the core 21 so that at all points they are widely spaced from this core with the result that very little flux passes from the laminated plate 28 directly through the air to the core 21. At the center of the laminated plate 28 it is provided with a magnetic screw 32 which extends toward the core 21 and is adjustable by virtue of its threaded engagement with the laminated plate 28 so as to be positioned closer to or farther from the core 21 with the result that it diverts more or less flux from the useful path through the disc 11. When screw 32 is close to core 21 the reluctance of the diversion path through plate 28 is low and the torque producing strength of the unit is lowered accordingly.

Although it is preferred to make all of the balancing adjustments on the front driving unit of a two-unit meter and leave the back one unchanged, this can only be accomplished if the one to be unchanged is within the range of adjustment of the one being adjusted. Since the two driving units 12 and 13 are commercially identical except for the balance plates thereon, it is obvious that the provision of the balance plate 28 on the driving unit 13 would usually make it appreciably weaker than the driving unit 12 would be without such a plate. It is therefore necessary to put such a plate on the unit 12. This plate may be identical with the balancing plate 28, the screw 32 being initially set in some mid-position, which is pretty sure to put this unit within the range of strength resulting from adjustment of the screw 32 of the front unit 13.

However, since the rear unit 12 is not to be adjusted, it may be preferred to provide it with a different balancing plate 36 which has been shown in connection with it in Fig. 1. This balancing plate 36 may be the same as that shown in Figs. 4 and 5, although special mounting features have also been shown in Figs. 4 and 5. The balancing plate 36 is shown as including flanges 37, for giving adequate cross section in a minimum height, and shoes 38. The purpose of the shoes 38, which may be welded to the plate 36, is to extend the plate closer to the main laminations 18 adjacent the core 21 and in the vicinity of the yokes 22 than in the vicinity of the gaps 26. It may be noted that in Figs. 4 and 5 the parts which are normally accommodated by the gaps 26 are shown in place, these parts including bolts 39 which may be tightened or removed through holes 40 provided in balance plate 36. These same bolts 39 would be used in the gaps 26 in Figs. 2 and 3 but have been omitted for the sake of clarity in describing the theory of the balancing plates. It is very rarely necessary to tighten or remove the bolts 39 after they have once been put in place and, accordingly, the holes 40 are not provided in the balancing plate 28, which may be removed with great ease in case of necessity.

Since the plate 36 will not ordinarily be adjusted once it has been applied to the unit 12, its adjustability need not be as simple as that shown in connection with the plate 28 in Fig. 3. The adjustment should nevertheless be reasonably easy in case there ever should be occasion to adjust it as, for example, if the range of adjustment provided by the screw 32 should in individual instances prove to be inadequate. Furthermore, the initial adjustment of plate 36 must be dependably permanent. In other words, once adjusted, it must not be subject to change except when changed intentionally. This adjustment is provided by means of screws 42 which are journaled in plate 36 and screw into split sleeves 43. The split sleeves 43 are provided with heads 44 at one end and are held in place with the heads 44 against the laminations 18 by screws 46, which may bear on washers 47. The split sleeves 43 are biased to engage the screws 42 with resilient pressure to eliminate any looseness or backlash at this point. The screws 42 are journaled in the plate 36 in a manner to be free from backlash. On the left-hand screw 42 a collar 49 is formed on the screws. A bushing 51 is slipped over its head and pressed or contracted under it with the result that it engages the head of the screw and the plate 36 with sufficient pressure to prevent any looseness or play at this point. In the case of the right-hand screw 42 a collar 53 formed on the screw is resiliently pinched between the plate 36 and the shoe 38, and the bushing 51 is not necessary. The right-hand construction may be a little less dependable but may be used wherever space is limited. In both forms the screws 42, sleeves 43, screws 46 and washers 47 are all preferably non-magnetic.

It should be recognized that the balancing plate 36 may be used in place of the preferred balancing plate 28 if there should be occasion to do so. As a matter of fact, the plate 36 was originally used on both of the driving units 12 and 13 and was a great improvement over prior balancing devices. The provision of the two adjusting screws 42 was recognized as an inconvenience, however, and a one-screw form was sought. The expedient of operating the plate 36 with one screw is not considered the best solution since any simple form of one-screw adjustment of this plate would result in great unevenness in the plate at times and it is desirable to keep the plate even or parallel with the main laminated structure 18 so as to shunt flux equally from the yokes 22 on both sides.

The final solution of the problem, shown in Figs. 2 and 3, is extremely satisfactory but was fraught with some difficulties which should be mentioned as a guide to others in practicing this invention. One of these difficulties was to provide a screw, or other movable magnetic element such as the screw 32, which is of large enough cross section to provide the desired range of adjustment without introducing errors in the meter accuracy particularly due to the effect which such a large screw or plug would be likely to have in causing a phase lag in the alternations of the magnetic flux. A related problem was the problem of making such a screw 32 or other plug free from play in its adjustment. It was considered having such a screw screw through a split collar, but if the collar were made of a non-magnetic material it would more or less nullify the effect of the screw or plug since it would create in effect an air gap between the plate 28 and the screw 32. If the collar were made of a magnetic material, it would aggravate the phase disturbing difficulty.

The phase disturbing difficulty is due to eddy currents. It is not considered practical to eliminate these eddy currents from the screw 32 by any lamination of such screw. The problems, however, were all solved at once through the expedient of making the plate 28 laminated. With the plate 28 laminated it has substantially no phase disturbing effect in itself and it was found that any phase disturbing effect of screw 32 alone is utterly insignificant even when the screw is not laminated.

The lamination of the plate 28 also permitted omission of a split collar since all play between the screw 32 and the laminations 28 may be avoided by virtue of the resiliency of the laminations. To this end the threads are cut into the hole through the laminations while the laminations are clamped tightly together. When the clamping pressure is released, they naturally spring apart sufficiently to grip the threads of the screw 32 with resilient pressure. If preferred, the laminations can be artificially spread apart as by the temporary insertion of a wedge therebetween so as to give them a more decided set or bias toward the separated position with the result that they will grip the screw 32 more firmly. Of course, the laminations should be clamped together while the screw 32 is screwed through them. As a matter of practice, the threads can be cut in the plate 28 by the screw 32 itself while the laminations are held clamped together, the laminations having been previously spread apart if necessary.

Ordinary lamination stock may be used for the plate 28, and it should be noted that the plate 36 and shoes 38 should also be formed of a magnetic metal which is substantially without magnetic retentivity and has high permeability.

From the foregoing it is seen that a balancing plate is provided which may be applied to a conventional watt-hour meter driving unit such as is made in large quantities and consequently at the greatest possible economy for single phase meters. When applied, the balancing plate adapts a driving unit for use in polyphase meters and permits the easy and dependably permanent balancing of two or more driving units without altering the extremely high degree of accuracy for which the driving unit is designed.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:
1. A multi-element watt-hour meter including disc means mounted for continuous rotation, damping means for retarding the rotation of the disc means, and a plurality of driving units adapted to drive the disc means, at least one of said units including an electromagnetic coil, a laminated structure including a core extending through said coil, a yoke magnetically connected with the core at one end for causing flux to pass through the disc means and separated from the other end of the core by a gap, and a balancing device including a laminated magnetic plate secured to the yoke and a magnetic screw carried by the plate and adjustable to approach the core.

2. A multi-element watt-hour meter including disc means mounted for continuous rotation, damping means for retarding the rotation of the disc means, and a plurality of driving units adapted to drive the disc means, at least one of said units including an electromagnetic coil, a laminated structure including a core extending through said coil, a yoke magnetically connected with the core at one end for causing flux to pass through the disc means and separated from the other end of the core by a gap, and a balancing device including a laminated magnetic plate secured to the yoke and a magnetic screw carried by the plate and adjustable to approach the core, said screw having a threaded engagement directly with the laminations of the plate and said laminations being biased toward a position in which their screw-engaging threads are out of alinement whereby they resiliently grip the screw.

3. A balancing device for a watt-hour meter of the type having a magnetic core and yokes connected to one end of the core and spaced from the other end by gaps, including a laminated plate having a central portion adapted to bridge the core and gaps at a point remote therefrom, offset end portions adapted to extend into proximity with the yokes, and a magnetic screw threaded directly to the laminations and adapted to be positioned adjacent the center of the core and to approach and recede therefrom by a screwing movement with respect to the laminations.

4. A multi-element watt-hour meter including disc means mounted for continuous rotation, damping means for retarding the rotation of the disc means, and a plurality of driving units adapted to drive the disc means, at least one of said units including an electromagnetic coil, a laminated structure including a core extending through said coil, a yoke magnetically connected with the core at one end for causing flux to pass through the disc means and separated from the other end of the core by a gap, a balancing device including a laminated magnetic plate secured in contact with the yoke, and a magnetic adjustment member extending between the plate and the core and variable to adjust the gap therebetween.

STANLEY S. GREEN.